July 5, 1966  W. J. KRUPICK ETAL  3,258,976
AZIMUTH ALIGNMENT SENSOR

Filed Dec. 31, 1962  9 Sheets-Sheet 1

WALTER J. KRUPICK
RICHARD F. CIMERA
WILLIAM F. O'BRIEN, JR.
INVENTORS

BY S. A. Giarratana
Francis L. Masselle
ATTORNEYS

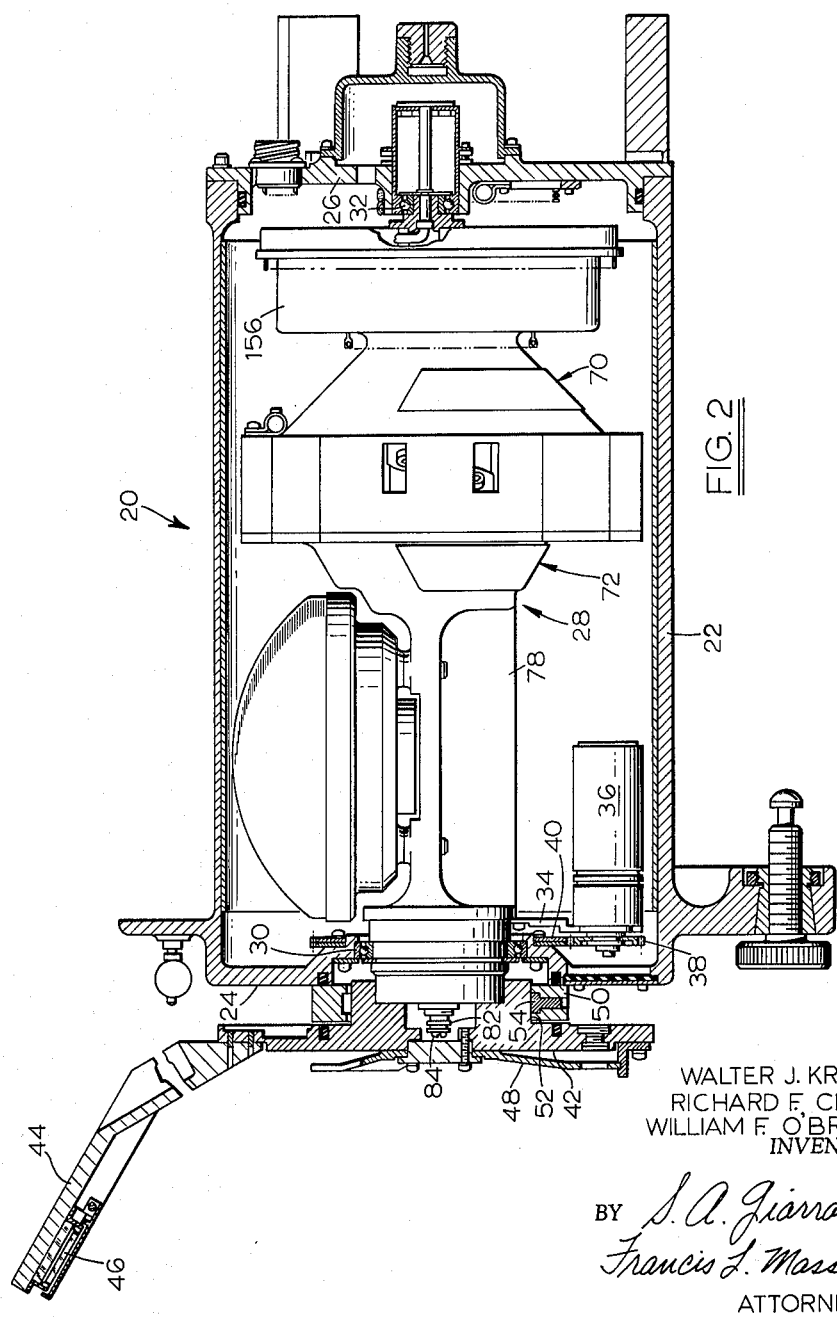

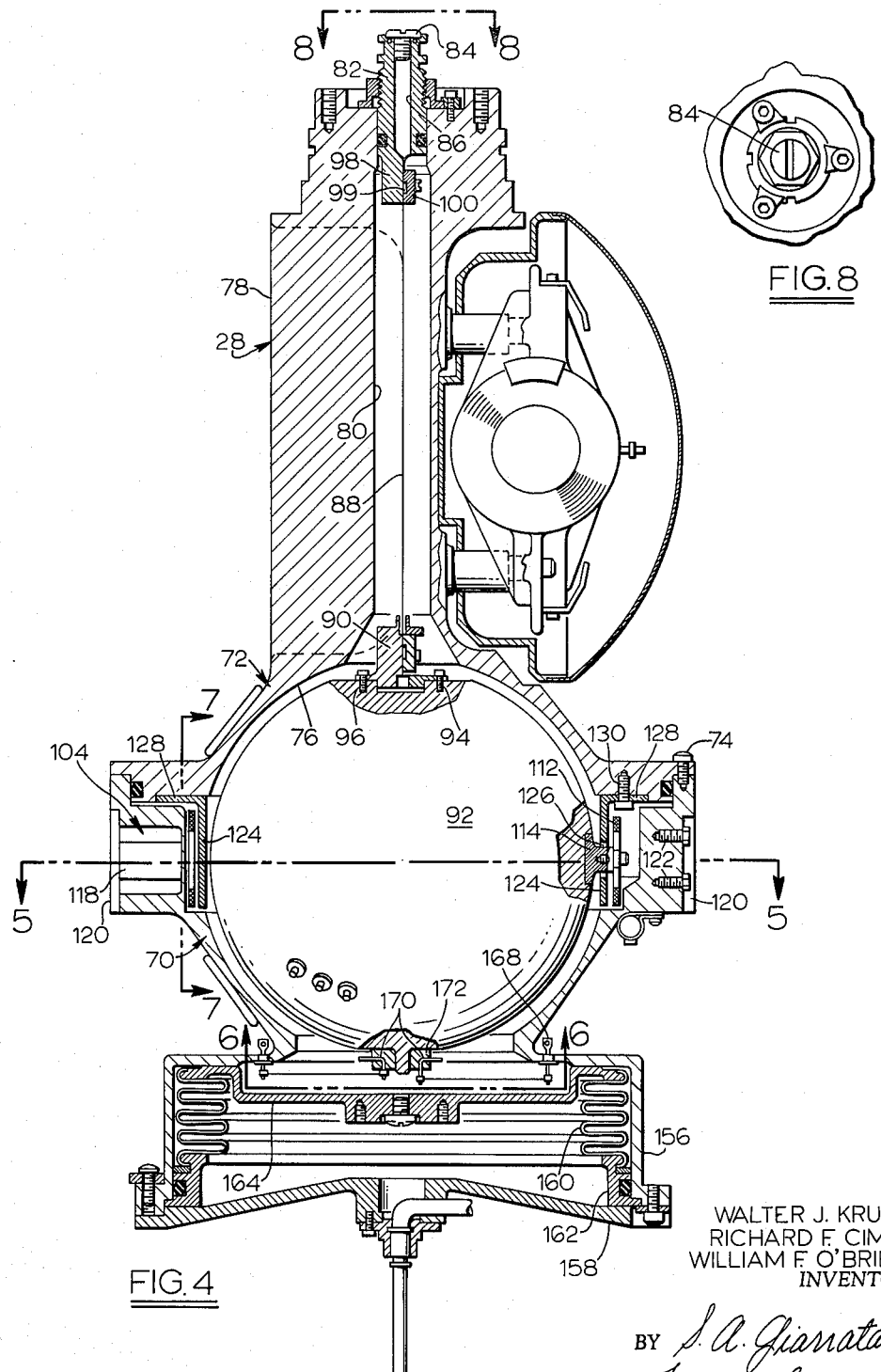

July 5, 1966   W. J. KRUPICK ETAL   3,258,976
AZIMUTH ALIGNMENT SENSOR

Filed Dec. 31, 1962   9 Sheets-Sheet 4

WALTER J. KRUPICK
RICHARD F. CIMERA
WILLIAM F. O'BRIEN, JR.
INVENTORS

BY S. A. Giarratana
Francis L. Masselle
ATTORNEYS

July 5, 1966   W. J. KRUPICK ET AL   3,258,976
AZIMUTH ALIGNMENT SENSOR

Filed Dec. 31, 1962   9 Sheets-Sheet 5

WALTER J. KRUPICK
RICHARD F. CIMERA
WILLIAM F. O'BRIEN, JR.
INVENTORS

BY S. A. Giarratana
Francis L. Masselle
ATTORNEYS

July 5, 1966  W. J. KRUPICK ETAL  3,258,976
AZIMUTH ALIGNMENT SENSOR
Filed Dec. 31, 1962  9 Sheets-Sheet 7
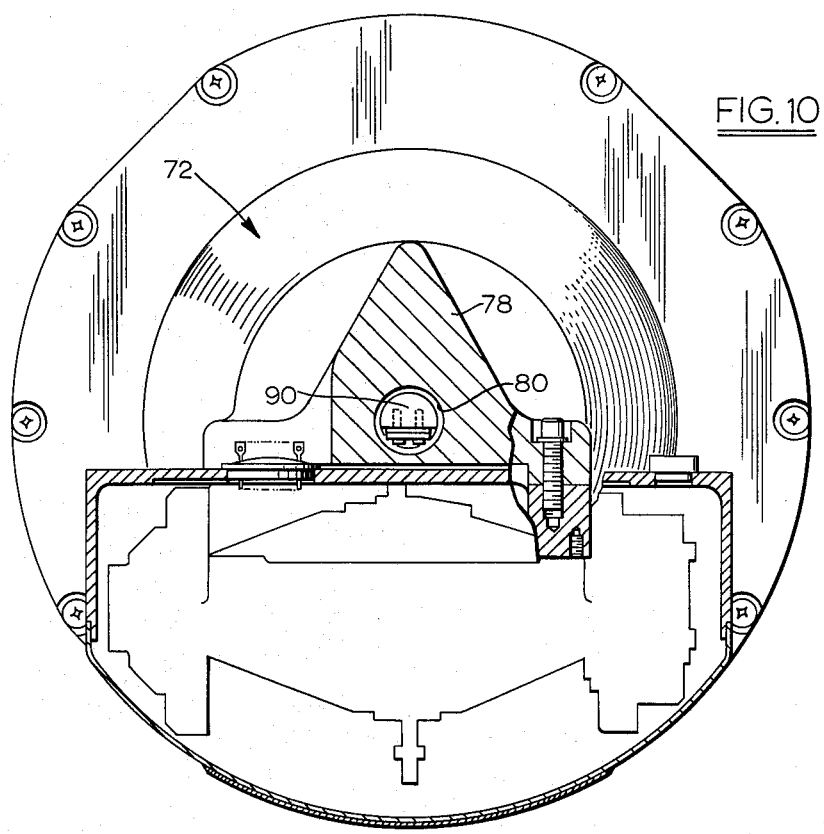
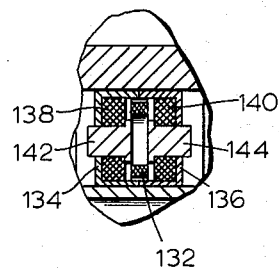
WILLIAM J. KRUPICK
RICHARD F. CIMERA
WILLIAM F. O'BRIEN, JR.
INVENTOR.
BY S. A. Giarratana
Francis L. Masselle
ATTORNEYS 3,258,976
AZIMUTH ALIGNMENT SENSOR
Walter J. Krupick, Franklin, and Richard F. Cimera, Caldwell Township, N.J., and William F. O'Brien, Jr., Clearwater, Fla., assignors to General Precision Inc., Little Falls, N.J., a corporation of Delaware
Filed Dec. 31, 1962, Ser. No. 248,637
14 Claims. (Cl. 74—5.6)

The present invention relates to azimuth alignment sensors and more particularly to an azimuth gyroscope for gyroscopically determining the location of North.

Prior gyro designs for gyroscopically determining the location of North utilized a wire-suspended gyroscope as the key earth's-rate-sensor gyro. A damper was mounted between two to four inches below the gyro input axis and the takeoff rotor and torquer bobbin were mounted on the gyro motor with the takeoff stator and torquer magnets mounted on the fixed case. The suspension wire was brazed to its supporting structure. Since the wire-suspended gyro acts as a plumb bob and seeks local vertical, any deviation of the supporting structure from vertical introduced relative lateral displacement between the fixed and rotating parts of the takeoff, torquer and damper. Lateral displacements were also produced when the structure was subjected to vibration or accelerations.

This prior design had a number of basic disadvantages. When relative lateral motion of the takeoff rotor with respect to the stator occurs, a precession axis null shift was introduced. Lateral motion of the torquer bobbin and magnet changed the torquer scale factor, and lateral motion between the damper rotor and stator applied a large torque about the gyro input axis so that large drift rates were experienced. Further, when the gyro was allowed to precess or rotate about its precession axis, large hysteresis occurred at the wire suspension brazed points. All of these factors contributed to large azimuth heading errors.

In accordance with the present invention, these disadvantages are overcome by providing a wire-suspended gyro having an improved takeoff and torquer geometry so that substantially no null shift occurs in the takeoff in response to lateral motions resulting from level changes or vibrations, and no torquer scale factor change occurs as a result of lateral motions. In addition, a special clamping arrangement is provided so that no hysteresis is induced in the wire suspension system when lateral and/or torsional motions occur, and a symmetrical damping design is employed which concentrates the net damping force in the plane of the gyro input and spin axes in a manner to minimize torques coupled through the damping fluid. Net restraint changes in the flexleads or pigtails also are eliminated by a symmetrical arrangement of the pigtails which cancels individual pigtail restraint changes.

Accordingly, it is the principal object of the present invention to provide an improved gyro design for gyroscopically determining the location of North.

It is another object of the invention to provide a gyro design for gyroscopically determining the location of North to within 20 arc seconds within 15 minutes of time in environments which vary from missile launchers to hard or soft ground.

It is a further object of the invention to provide a wire-suspended gyro which is isolated from errors induced by external rates, vibrations and torques to the supporting structure of the wire suspension system.

It is a still further object of the invention to provide a gyro having a takeoff and torquer which are insensitive to motions other than pure tangential motions.

It is a still further object of the invention to provide a gyro which is damped in a manner to minimize the torques coupled through the damping fluid due to vibration or settling of the supporting structure.

It is a still further object of the invention to provide a wire-suspended gyro having a spherical gyro motor with a pair of secondary coils of the takeoff and a pair of torquing coils mounted on the equator of the gyro motor housing in position to define two orthogonal axes, the takeoff and torquer arrangement being such that substantially no change in the torquer scale factor occurs as a result of lateral motion of the gyro motor housing, and no null shift in the takeoff occurs for lateral motions of the motor resulting from level changes or vibrations.

It is a still further object of the invention to provide a wire-suspended gyro of the type described utilizing a clamping technique which eliminates hysteresis in the wire suspension system when lateral and/or torsional motions occur.

It is a still further object of the invention to provide a wire-suspended gyro of the type described having a symmetrical damping design which concentrates the net damping force in the plane of the gyro input and spin axes to minimize the torques coupled about the input axis when level changes or lateral motions occur.

It is a still further object of the invention to provide a gyro of the type described having a symmetrical pigtail arrangement which cancels individual pigtail restraint changes.

Other objects and features of novelty of the present invention will be specifically pointed out or will otherwise become apparent when referring, for a better understanding of the invention, to the following description taken in conjunction with the accompanying drawings, wherein:

FIG. 2 is a sectional view taken along the line 2—2 of FIG. 1;

FIG. 4 is a longitudinal sectional view of the gyroscope housing and gyro motor assembly illustrated in FIG. 2;

FIG. 8 is a fragmentary end view taken along the line 8—8 of FIG. 4;

FIG. 10 is a sectional view taken along the line 10—10 of FIG. 9;

FIG. 11 is a fragmentary sectional view taken along the line 11—11 of FIG. 9;

Figure 1:
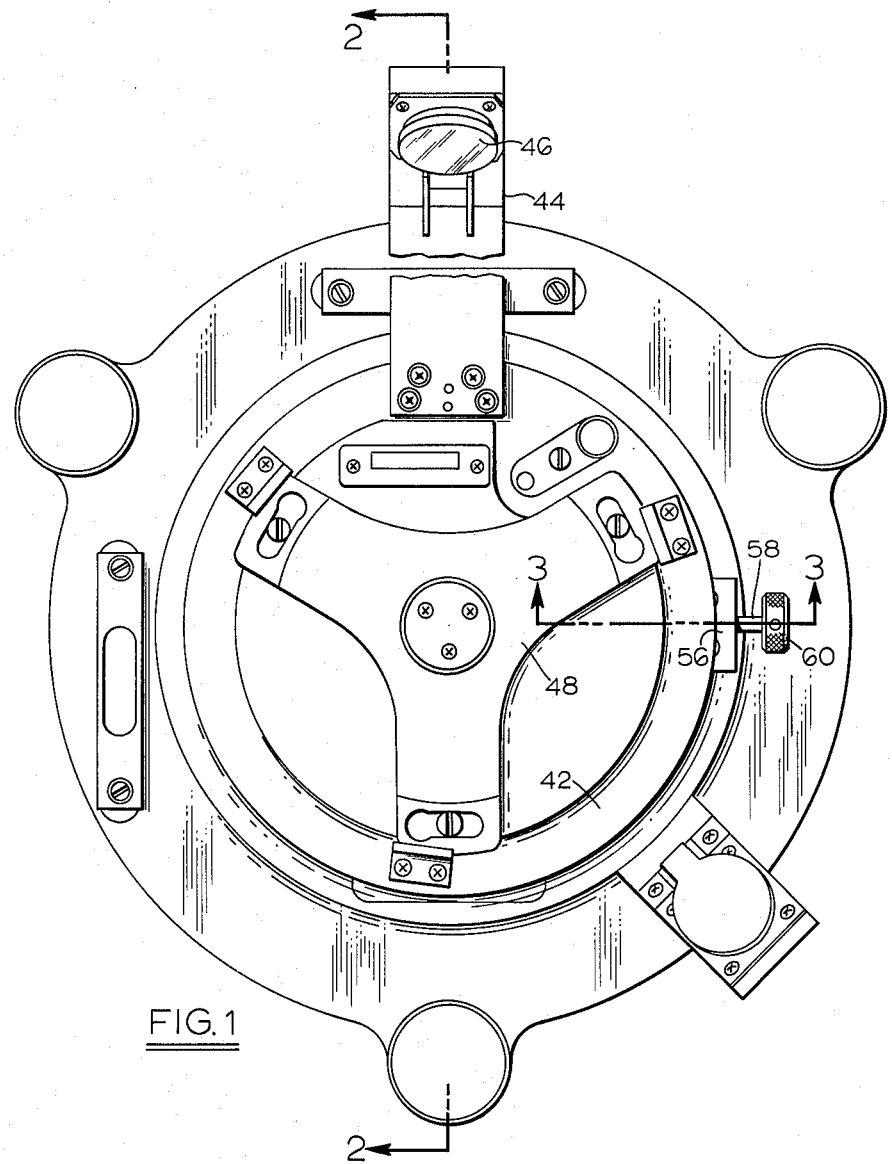
FIG. 1 is an end view of an azimuth reference gyro illustrating one embodiment of the present invention.

Referring to FIGS. 1 and 2, an azimuth reference gyro 20 is shown which illustrates one embodiment of the present invention. It comprises a cylindrical casing 22 having an end wall 24 integral therewith and an end wall 26 removably secured thereto. An elongated gyro housing 28 is rotatably journaled between the end walls 24 and 26 along the axis of the housing in a suitable manner, such as by bearings 30 and 32, respectively. A supporting arm 34 is fixed to and projects radially from the gyro housing 28 in position to support a small electric motor 36 which rotatably drives a pinion gear 38 on the end thereof when energized. The pinion gear 38 meshes with a large spur gear 40 fixed to the end wall 24 so as to revolve about the fixed spur gear when the motor 36 is energized and thus rotate the gyro housing 28 relative to the casing 22.

Figure 3:
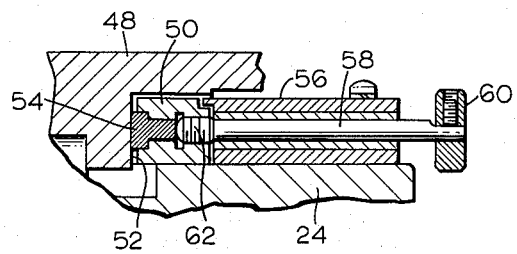
FIG. 3 is a fragmentary sectional view taken along the line 3—3 of FIG. 1.

A readout dial 42 is mounted on the end of the housing 28 for rotation therewith and includes an arm 44 extending upwardly at an angle therefrom. A mirror 46 is fixed on the end of the arm 44 for reflecting a light beam onto a scale (not shown) to indicate the angular position of the gyro housing 28. A suitable handle 48 having three equally spaced arms is fixed to the readout dial 42 to enable the gyro housing 28 to be manually rotated as well as electrically rotated by the motor 36. A clamping ring 50 is positioned about a cylindrical surface 52 of the readout dial 42 with a plurality of friction pads 54 on the inner surface thereof in position to engage the cylindrical surface 52. As appears in FIGURES 1 and 3, block 56 is bolted to the end wall 24 for slidably and rotatably supporting a pin 58 having a knurled knob 60 fixed on the outer end thereof and a threaded end portion 62 on the inner end thereof threadably engaging the clamping ring 50. When the knurled knob 60 is rotated, the rounded nose of the threaded end portion 62 forces the friction pad 54 adjacent thereto radially inward so that all of the friction pads frictionally engage the cylindrical surface 52 to clamp the readout dial 42 against rotation which, in turn, clamps the gyro housing 28 against rotation. To unclamp the readout dial and housing 28, the knurled knob 60 is merely rotated in the opposite direction to release the pressure on the friction pad 64. This clamp design produces minimal torque on the gyro housing when the clamp is operated.

Referring to FIGS. 4-12, the gyro housing 28 comprises a lower housing portion 70 and an upper housing portion 72 suitably secured together, such as, by a plurality of circumferentially spaced bolts 74 to define a spherical cavity 76. The upper housing portion 72 of the housing includes a stem 78 projecting upwardly therefrom and having a passageway 80 extending axially therethrough. A clamping fixture 82 is threadedly mounted in the upper end of the passageway with a screw 84 closing off the upper end of a central bore 86 therein. A wire 88 is positioned within the central passageway 80 and extends into the bore 86 with the upper end thereof clamped in fixture 82 in a manner which will appear presently. The lower end of the wire 88 is clamped in a clamping fixture 90 which is suitably secured to the top of a spherical gyro motor 92 such as by bolts 94 and 96.

The upper clamping fixture 82 has a downwardly projecting portion 98 with a vertical groove in a face 99 thereof for aligning the wire 88. A clamping block 100 is bolted to the face 99 to clamp the wire firmly in the groove. With this construction, the upper clamping fixture 82 can be adjusted vertically relative to the stem 78 to suspend the gyro motor 92 in its proper position. After the wire 88 has been pretensioned in this manner, the clamping block 100 can be tightened to support the wire 88 at this point. The threads in the upper clamping fixture and the screw 84 are preferably such that the height of the screw can be adjusted by holding it against rotation with a screw driver while rotating the upper clamping fixture relative to the stem 78. This clamping technique eliminates the hysteresis that would otherwise be induced in the wire suspension system by the brazed connection when lateral and/or torsional motions of the gyro motor occur.

A pair of torquer assemblies 104 and 106 are positioned at diametrically opposed portions of the equator of the gyro motor 92 on the input axis thereof, and a pair of takeoff assemblies 108 and 110 are positioned at diametrically opposed portions of the equator of the gyro motor 92 on the spin axis thereof. The torquer assemblies 104 and 106 each comprise a curved, rectangular torquer coil 112 carried on a support 114 fixed to the gyro motor 92. The torquer coil has a center of curvature coinciding with the center of the gyro motor, as most clearly seen in FIG. 5. A pair of permanent magnets 116 and 118 are interconnected by a curved, magnetically permeable plate 120 which is fastened to the periphery of the lower housing portion 70 by a pair of screws 122. Each of the magnets 116 and 118 projects radially inward adjacent to the ends of the torquer coil 112. A curved, magnetic return plate 124 overlies the concave face of the torquer coil 112 to provide a magnetic return path between the magnets 116 and 118 with the ends of the torquer coil positioned in the air gaps. The magnetic return plate 124 is slotted vertically as at 126 to clear the support 114 mounting the torquing coil on the gyro motor and has a right-angle flange 128 on the upper edge thereof which is bolted to the upper housing portion 72 by a pair of bolts 130. With this arrangement, the gyro motor 92 can be torqued by energizing the torquing coils 112 which are wound in series and move in constant flux fields when lateral motion of the gyro motor occurs. Therefore, there is no change in the torquer scale factor as a result of lateral motion.

Figure 5:
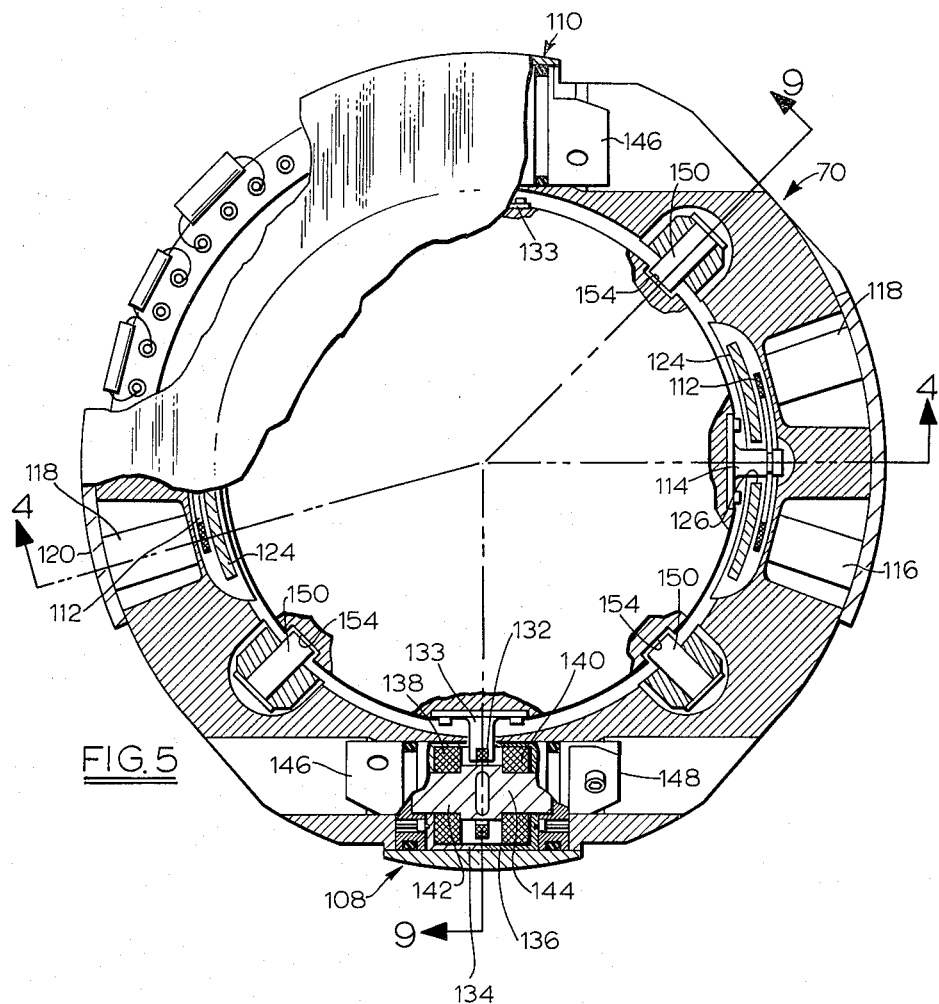
FIG. 5 is a sectional view taken along the line 5—5 of FIG. 4.
Figure 7:
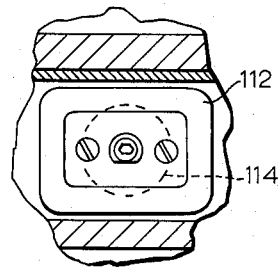
FIG. 7 is a sectional view taken along the line 7—7 of FIG. 4.
Figure 12:
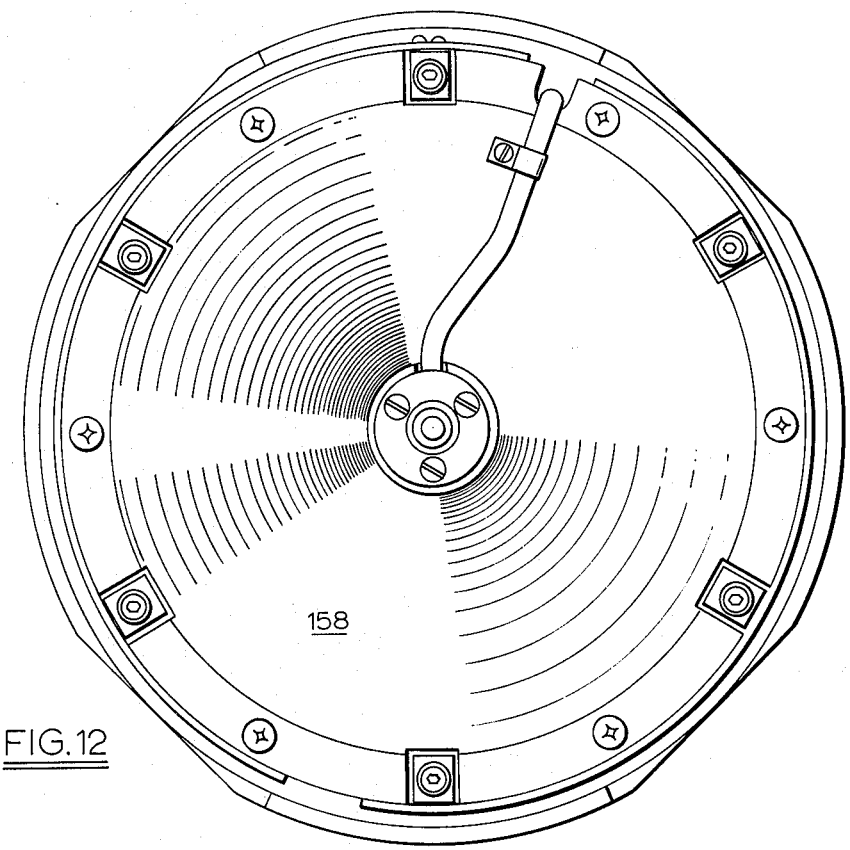
FIG. 12 is a bottom view of the structure illustrated in FIG. 9.
Figure 9:
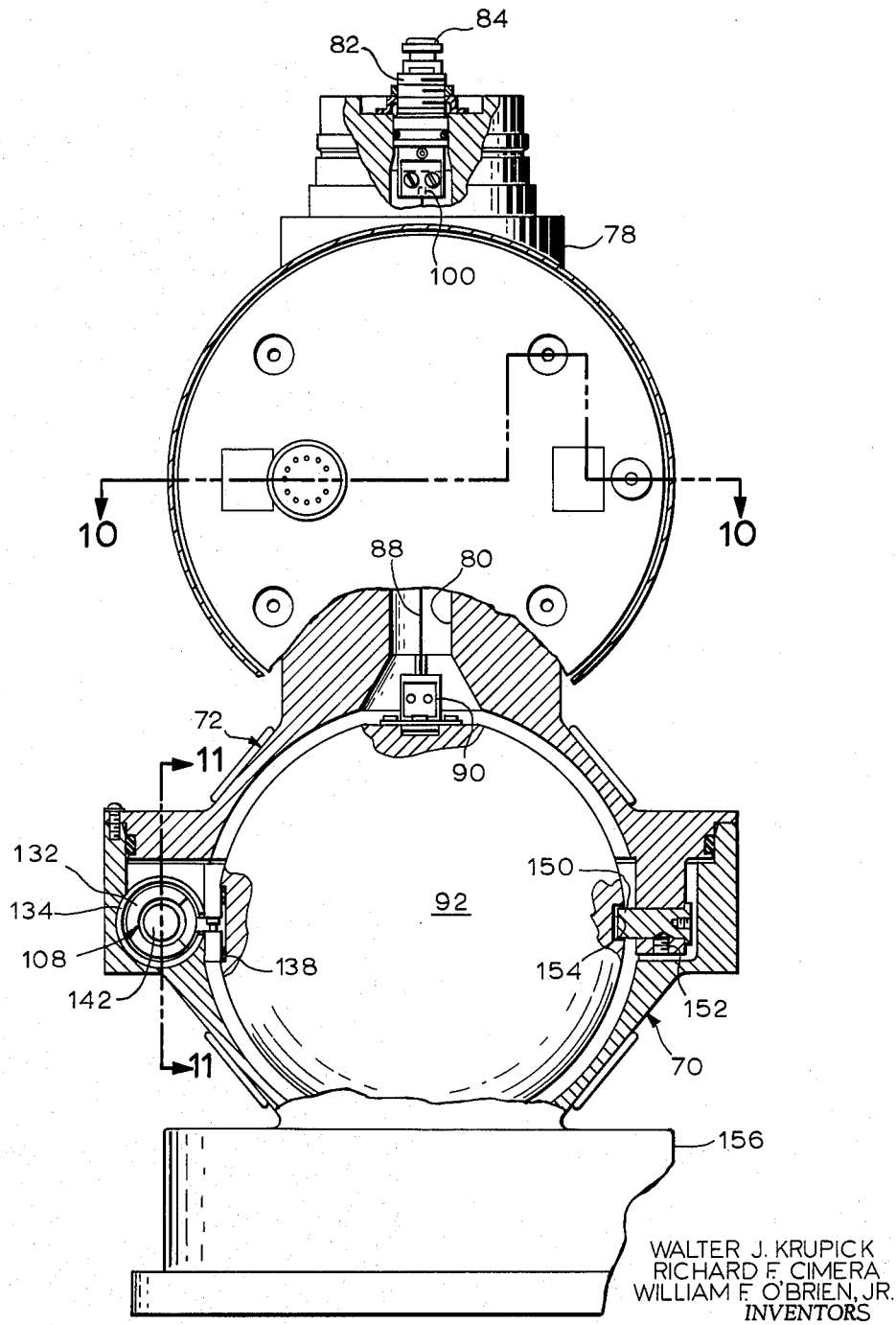
FIG. 9 is a side view of the structure illustrated in FIG. 4 with portions thereof shown in section taken along the line 9—9 of FIG. 5 to more clearly illustrate the inner components.

As most clearly seen in FIGS. 5, 9 and 11, each of the takeoff assemblies 108 and 110 comprises a secondary coil 132 fixed to the gyro motor 92 by a support 133 so that the coil lies in a vertical plane containing the precession axis of the gyro motor. A pair of cup-shaped magnetic permeable elements 134 and 136 are mounted in the lower housing portion 70 in position to enclose the secondary coil 132. Primary coils 138 and 140 are fixed within the elements 134 and 136, respectively, and the elements have central cores 142 and 144, respectively, which extend through the primary coils 138 and 140 and abut against one another within the secondary coil 132. The elements 134 and 136 have flanges 146 and 148, respectively, which project circumferentially therefrom and are bolted to the lower housing portion 70 to secure the elements thereto. With this arrangement the secondary coils 132 are free to precess with the gyro motor through a limited arc to provide a takeoff signal proportional to the precession of the gyro motor about the precession axis. The signals from each secondary coil are in phase and add to each other when a rotation about the precession axis occurs, and the signals are out of phase and cancel each other when lateral motion along the gyro motor input axis occurs. When the gyro motor shifts laterally along the spin and precession axes, the secondary coils move parallel to the lines of flux created by the primary coils so that no null shift occurs.

Four circumferentially spaced pins 150 are fixed to the upper housing portion 72 of the gyro by set screws 152 (FIG. 9) and project radially inward into cylindrical recesses 154 on the equator of the gyro motor 92. Sufficient clearance is provided between the cylindrical recesses 154 and the pins 150 to provide the limited freedom of movement required by the motor but to positively restrict excessive movement. The spherical cavity 76 is also filled with a suitable damping fluid, preferably of a very low viscosity, such as 200 centistokes, to damp the free movement of the gyro motor. The damping fluid acts between the gyro motor and the wall of the spherical cavity 76 and between the takeoff secondaries and the takeoff primaries to provide damping about the precession axis. The damping of the sphere inside of the spherical cavity is viscous shear and the damping of the takeoff secondaries inside of the primaries is a paddle effect. By employing the very low viscosity fluid, the damping from the takeoff is approximately 3.6 times the viscous shear damping at the spherical surfaces. The damping about the input axis is nearly the same as that about the precession axis for a sphere without paddles. Since the spherical gyro motor is a symmetrical body, and the paddles (the secondary takeoff coils 132) are located precisely on the geometric center of the gyro motor housing, all of the forces due to the damper act in the plane of the spin and input axes. Because this symmetrical damping design concentrates the net damping force in the plane of the gyro input and spin axes, only minute torques are coupled about the input axis when level changes or lateral motions occur.

Referring to FIGURE 4, the lower housing portion 70 of the gyro motor has a depending cylindrical skirt portion 156 which is closed off by a bottom wall 158. A bellows 160 is positioned within the skirt portion 156 and has a flanged ring 162 on the lower end thereof which is clamped between the bottom wall 158 and the rim of the skirt portion. A top plate 164 is fixed to he upper end of the bellows 160 so that the plate is free to move vertically against the resilient resistance of the bellows. With this construction, the top plate 164 and bellows 160 seal the damping fluid within the spherical cavity 76 in a manner to compensate for changes in volume of the damping fluid.

Figure 6:
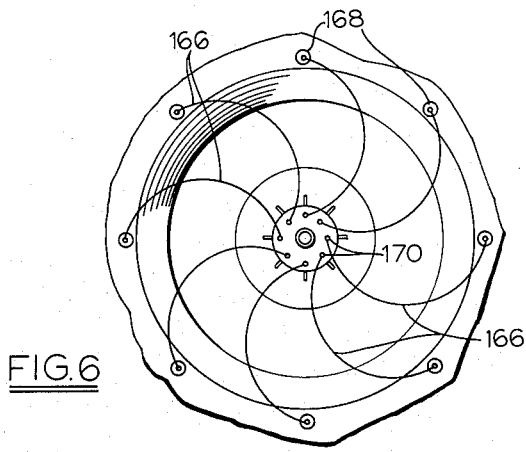
FIG. 6 is a sectional view taken along the line 6—6 of FIG. 4.

Referring particularly to FIGS. 4 and 6, the necessary electrical power is transmitted from the lower housing portion 70 to the gyro motor 92 and the pickoff secondary coils 132 and torquer coils 112 mounted thereon through eight symmetrically located, flexible pigtails 166. The pigtails 166 are substantially semi-circular with the radial outer ends thereof secured to a plurality of terminals 168 circumferentially spaced about and projecting through the top wall of the depending skirt portion 156. The inner ends of the pigtails are similarly connected to a plurality of circumferentially spaced terminals 170 fixed to and depending downwardly from an insulated ring 172 on the bottom of the gyro motor 92. The necessary electrical connections for the spin motor and the takeoff secondary coils and torquer coils can be made easily from the terminals 170 since these components are all fixed to the same body. By arranging the pigtails 166 symmetrically as shown, no net restraint changes in the pigtails occur in response to lateral motion of the gyro motor 92 with respect to the housing 28 because the changes in restraint of each pigtail is cancelled due to the symmetry.

Figure 13:
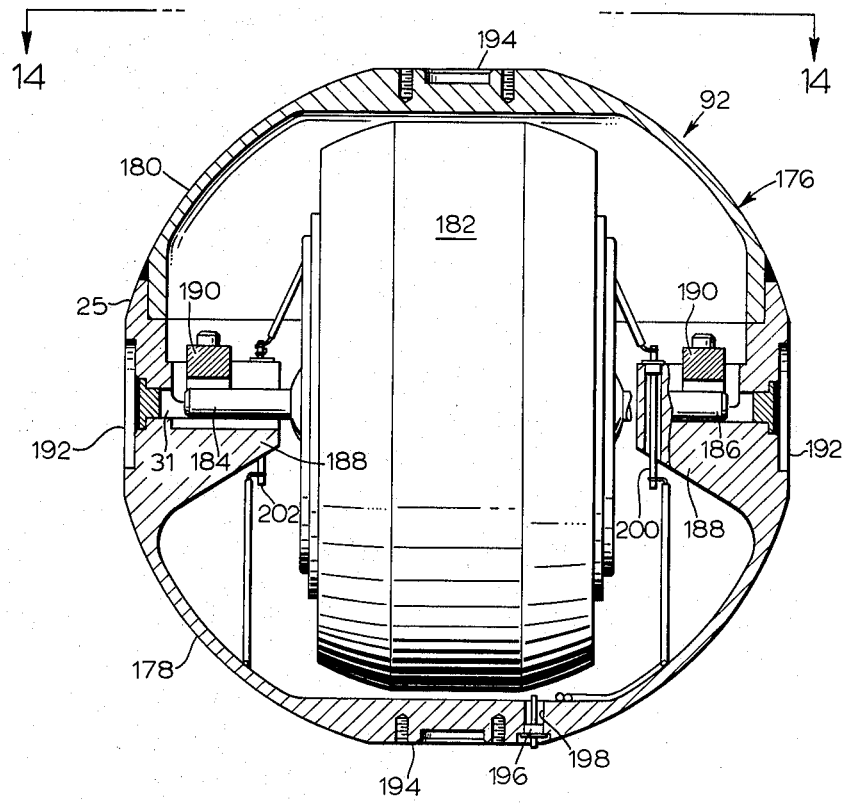
FIG. 13 is a sectional view of the gyro motor shown in FIG. 4.
Figure 14:
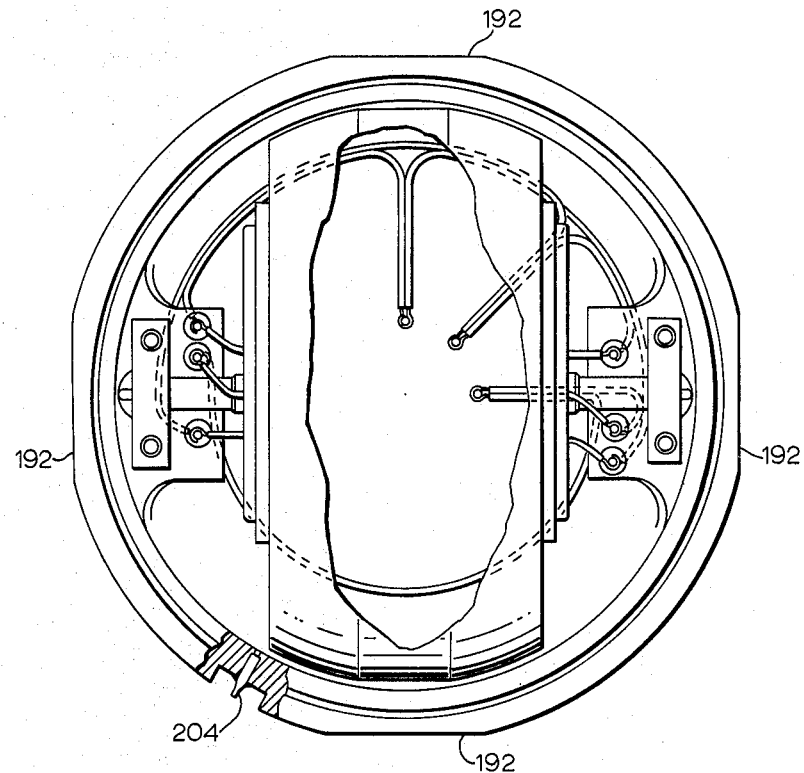
FIG. 14 is a view of the gyro motor taken along the line 14—14 of FIG. 13 with the top half of the outer shell removed.

Referring to FIGS. 13 and 14, the gyro motor 92 is shown in greater detail. It comprises a two-piece spherical shell 176 having a bottom shell portion 178 which extends above the diameter of the gyro motor and a top shell portion 180 which is secured to the bottom portion. A spin motor housing 182 having the gyro wheel therein is mounted on the lower shell portion 178 by a pair of stub shafts 184 and 186 projecting outwardly therefrom along the spin axis of the wheel. Each of the stub shafts rest on supports 188 projecting radially inwardly from diametrically opposed portions of the lower shell portion 78 and they are clamped to the supports by clamps 190. The lower shell portion 178 is provided with four equally spaced flats 192 on the equator thereof, and two additional flats 194 aligned with the precession axis of the gyro motor are provided on the top and bottom of the upper and lower shell portions. The supports 114 of the torquer coils 112 are fixed to the flats 192 aligned with the input axis of the gyro motor and the supports 133 of the control secondary coils 132 are fixed to the remaining two flats 192. The clamping fixture 90 clamping the lower end of the wire 88 is fixed to the upper flat 194 and the insulated ring 172 which carries the terminals 170 is fixed to the lower flat 194. Terminals 196, one of which is shown in FIG. 13, are fixed in and seal off apertures 198 in the wall of the lower shell portion 178 to enable power to be transmitted into the shell 176 from the terminals 170 connected to the inner ends of the pigtails. A plurality of terminals 200 are fixed on one of the supports 188 to facilitate the necessary electrical connections to one side of the spin motor housing 182 and a plurality of terminals 202 are fixed on the other support 188 to enable the necessary electrical connections to be made to the other side of the spin motor housing. The interior of the spherical shell 176 may be evacuated through a fitting 204 (FIG. 14) and the interior can be filled through this same fixture with an inert gas or the like, if desired.

The gyro 20 is operated as follows. The spin axis of the gyro motor 92 is aligned approximately to North within approximately plus or minus one degree, either manually by rotating the readout dial 42, or electrically by energizing the electric motor 36. The gyro motor is then maintained at takeoff null by sending the takeoff output signal to an amplifier and demodulator and then into the torquer coils 112 mounted on the gyro motor. This torquer current is read to provide an indication of the drift due to the earth's rotation. The casing 22 is then rotated precisely 180° and the gyro motor 92 is again maintained at takeoff null by sending the takeoff output signal to the amplifier and demodulator and back to the torquer coil, as before, so that the torquer current can be read again. The difference between the current values in each of the 180° positions divided by twice the torquer scale factor is the precise value of the drift due to the earth's rotation. Therefore the angle of the spin axis off of north can be determined since $$\omega e \cos \lambda \sin \psi e = D$$

where $D$ = drift due to earth's rotation
$\omega e$ = earth's rate about its own axis
$\lambda$ = latitude
$\psi e$ = displacement angle of the gyro spin axis from North therefore $$\psi e = \sin^{-1} \frac{D}{(\omega e \cos \lambda)}$$

But certain assumptions must be made in order for accurate results to be obtained from the above formulae. First the bias or fixed restraints from the wire suspension and pigtails must remain constant between the two readings of the torquer current in each of the 180° positions. Second, the takeoff null must not shift between readings, and third, the torquer scale factor must not change between readings. The present invention as embodied by the gyro 20, enables these assumptions to be made despite the fact that the structure which supports the gyro will be subjected to level changes and vibrations induced by winds for any practical application. This is true, of course, because the gyro 20 has been made insensitive to level changes and vibration so that no null shift in the takeoff occurs for lateral motions resulting from the level changes and vibration, no torquer scale factor change occurs for lateral motions, no hysteresis is induced in the wire suspension system as a result of lateral motions because of the clamping technique utilized, no net restraint changes in the pigtails takes place because individual pigtail restraint changes are cancelled due to the symmetrical arrangement, and finally, only minute torques at most are coupled about the input axis of the gyro motor when level changes or lateral motions occur because of the symmetrical damping design which concentrates the net damping force in the plane of the gyro input and spin axes.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

The embodiments of the invention in which an exclusive property or privilege is claimed are defined as follows:

1. A gyro comprising a housing, a substantially spherical gyro motor suspended within said housing by a wire suspension system, said gyro motor being free to precess about a vertical axis determined by said wire suspension system, takeoff means for producing an output signal in response to precession of the gyro motor, and torquer means for torquing said gyro motor about the precession axis, said torquer and takeoff means including respective coacting stationary and mobile elements mounted on the equator of said spherical gyro motor.

2. The invention as defined in claim 1 wherein said torquer means includes a pair of torquer assemblies including mobile elements mounted on diametrically opposed portions of the equator of said gyro motor aligned with the spin axis thereof, and said takeoff means comprises a pair of takeoff assemblies including mobile elements mounted on diametrically opposed portions of the equator of said gyro motor aligned with the input axis thereof.

3. The invention as defined in claim 2 wherein the mobile elements of said torquer assemblies are positioned in uniform radially extending magnetic fields thus imparting to the torquer assemblies a scale factor which does not change as a result of lateral movement of said gyro motor.

4. The invention as defined in claim 2 wherein each of said takeoff assemblies includes a respective secondary coil mounted on said gyro motor at the equator thereof and projecting radially therefrom, the axis of each of said secondary coils being parallel to the spin axis of the gyro motor, and primary coil means on said housing for producing a uniform magnetic field linked with each of said secondary coils and extending parallel to the axes thereof.

5. The invention as defined in claim 1 wherein said housing defines a spherical cavity about said gyro motor, and including a low viscosity damping fluid filling said cavity, said fluid cooperating with the fixed and mobile elements of said takeoff means to provide paddle effect damping against precession of the gyro motor.

6. A gyro comprising a housing having a spherical cavity therein, a substantially spherical gyro motor positioned within said cavity, wire means connected to said housing and gyro motor for suspending said gyro motor within said cavity for precession about an axis determined by said wire means, a pair of torquers for torquing said gyro motor about said precession axis, each of said torquers comprising a movable element mounted on the equator of said gyro motor and a stationary element mounted on the wall of said spherical cavity, said movable elements being diametrically opposed to one another so as to define a first orthogonal axis, and a pair of takeoff assemblies for producing an output signal in response to precession of the gyro motor, each of said takeoff assemblies comprising a secondary coil mounted on and projecting radially from the equator of the gyro motor, said secondary coils being diametrically opposed to one another and defining a second orthogonal axis, the axis of each of said secondary coils being parallel to said first orthogonal axis, said takeoff assemblies further comprising primary coil means mounted on the wall of said cavity adjacent to each of said secondary coils for producing a magnetic field linked with and extending parallel to the axis of the secondary coil associated therewith.

7. The invention as defined in claim 6 wherein the movable element of each of said torquers comprises a torquing coil mounted on and spaced from the equator of the gyro motor, said torquing coil being curved about said precession axis, magnetic return path means mounted on the wall of said cavity and overlying the concave face of said torquer coil, and a pair of magnetically interconnected permanent magnets mounted on the wall of said cavity adjacent to each end of said torquer coil, said magnetic return path means being curved about said precession axis so as to cooperate with the pole faces of each of said permanent magnets to define a pair of uniform magnetic field air gaps adjacent to each end of the torquer coil.

8. The invention as defined in claim 6 wherein said primary coil means associated with each of said secondary coils comprises a pair of primary coils coaxially aligned with and positioned on opposite sides of the secondary coil associated therewith.

9. The invention as defined in claim 8 said primary coil means includes a pair of cup-shaped magnetic permeable elements mounted on the wall of said cavity, each of said cup-shaped elements extending over one of said primary coils and partially over said secondary coil, and a central core extending through the primary coils and the secondary coil.

10. The invention as defined in claim 9 including a damping fluid filling said spherical catvity, including the space between said primary and secondary coils.

11. A gyro comprising a housing having a spherical cavity therein and a stem projecting upwardly therefrom, said stem having a central passageway extending therethrough and communicating with said spherical cavity, a first clamping fixture adjustably mounted in the upper end of said central passageway, a substantially spherical gyro motor positioned within said cavity, a second clamping fixture attached to said gyro motor, and a wire extending through said central passageway with the upper end thereof clamped by said first clamping fixture and the lower end thereof clamped by said second clamping fixture in a manner to suspend said gyro motor within said spherical cavity for precession about an axis determined by said wire.

12. The invention as defined in claim 11 wherein said first clamping fixture comprises a body threadably mounted in the upper end of said central passageway and having a central bore extending therethrough.

13. The invention as defined in claim 11 including takeoff and torquer means having respective movable elements mounted on said gyro motor, a plurality of terminals mounted on the bottom of said gyro motor and circumferentially spaced about the precession axis thereof, a plurality of terminals mounted on said housing about the terminals on the gyro motor and circumferentially spaced about the precession axis of the gyro motor, and substantially semi-circular pigtails interconnecting each terminal on the housing with a corresponding terminal on the gyro motor, said pigtails being oriented in the same direction in a symmetrical arrangement so that no net restraint changes occur in the pigtails in response to lateral movement of the gyro motor.

14. A gyro comprising a housing having a spherical cavity therein, a substantially spherical gyro motor positioned within said cavity, wire means connected to said housing and gyro motor for suspending said gyro motor within said cavity, takeoff and torquer means having respective movable elements mounted on said gyro motor, a plurality of terminals mounted on the bottom of said gyro motor and circumferentially spaced about the precession axis thereof, a plurality of terminals mounted on said housing about the terminals on the gyro motor and circumferentially spaced about the precession axis of the gyro motor, and substantially semi-circular pigtails interconnecting each terminal on the housing with a corresponding terminal on the gyro motor, said pigtails being oriented in the same direction in a symmetrical arrangement so that no net restraint changes occur in the pigtails in response to lateral movement of the gyro motor.

References Cited by the Examiner

UNITED STATES PATENTS

| 2,746,301 | 5/1956 | Henderson | 74–5 |
| 2,951,374 | 9/1960 | Summers | 74–5.5 |
| 2,968,956 | 1/1961 | Agins | 74—5.9 |

FOREIGN PATENTS

| 886,063 | 1/1962 | Great Britain. |

FRED C. MATTERN, Jr, *Primary Examiner.*

BROUGHTON G. DURHAM, *Examiner.*

P. W. SULLIVAN, *Assistant Examiner.*